(12) United States Patent
Rajeev et al.

(10) Patent No.: US 11,756,290 B2
(45) Date of Patent: Sep. 12, 2023

(54) SYSTEM FOR INTELLIGENT DRIFT MATCHING FOR UNSTRUCTURED DATA IN A MACHINE LEARNING ENVIRONMENT

(71) Applicant: Bank of America Corporation, Charlotte, NC (US)

(72) Inventors: Harikrishnan Rajeev, Trivandrum (IN); Vinita Gummalla, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 490 days.

(21) Appl. No.: 16/897,729

(22) Filed: Jun. 10, 2020

(65) Prior Publication Data

US 2021/0390348 A1 Dec. 16, 2021

(51) Int. Cl.
| | |
|---|---|
| G06V 10/82 | (2022.01) |
| G06N 20/00 | (2019.01) |
| G06F 18/21 | (2023.01) |
| G06F 18/22 | (2023.01) |
| G06F 18/214 | (2023.01) |
| G06V 10/774 | (2022.01) |
| G06N 3/084 | (2023.01) |

(52) U.S. Cl.
CPC ............ *G06V 10/82* (2022.01); *G06F 18/217* (2023.01); *G06F 18/2148* (2023.01); *G06F 18/22* (2023.01); *G06N 20/00* (2019.01); *G06V 10/774* (2022.01); *G06N 3/084* (2013.01)

(58) Field of Classification Search
CPC ......... G06N 20/00; G06V 10/70; G06V 10/80
See application file for complete search history.

(56) References Cited

U.S. PATENT DOCUMENTS

| | | | |
|---|---|---|---|
| 3,327,291 A | 6/1967 | Lee | |
| 5,719,692 A | 2/1998 | Cohen | |
| 5,832,467 A | 11/1998 | Wavish | |
| 5,832,468 A | 11/1998 | Miller et al. | |
| 5,963,910 A | 10/1999 | Ulwick | |
| 6,018,619 A | 1/2000 | Allard et al. | |
| 6,112,304 A | 8/2000 | Clawson | |
| 6,507,726 B1 | 1/2003 | Atkinson et al. | |
| 6,523,015 B1 | 2/2003 | Bera et al. | |
| 6,894,972 B1 | 5/2005 | Phaal | |

(Continued)

*Primary Examiner* — Wen W Huang
(74) *Attorney, Agent, or Firm* — Moore & Van Allen PLLC; Anup Shrinivasan Iyer

(57) ABSTRACT

Systems, computer program products, and methods are described herein for intelligent drift matching for unstructured data in a machine learning environment. The present invention is configured to receive an original unseen image from a computing device; initiate a convolutional encoder-decoder algorithm on the original unseen image; generate a reconstructed unseen image; generate an unseen input dataset based on at least the reconstructed unseen image; determine a reconstruction loss associated with the original unseen image; determine that the reconstruction loss associated with the original unseen image matches a first reconstruction loss associated with a first training image, wherein the first training image is associated with one or more training images; retrieve, from the data repository, a first set of parameters associated with the first training image based on at least determining the match; classify, using the first set of parameters, the original unseen image into one or more class labels.

20 Claims, 4 Drawing Sheets

(56) References Cited

U.S. PATENT DOCUMENTS

| | | | |
|---|---|---|---|
| 6,941,367 B2 | 9/2005 | Vosseler et al. | |
| 7,023,979 B1 | 4/2006 | Wu et al. | |
| 7,219,085 B2 | 5/2007 | Buck et al. | |
| 7,328,218 B2 | 2/2008 | Steinberg et al. | |
| 7,480,640 B1 | 1/2009 | Elad et al. | |
| 7,499,897 B2 | 3/2009 | Pinto et al. | |
| 7,600,007 B1 | 10/2009 | Lewis | |
| 7,689,520 B2 | 3/2010 | Burges et al. | |
| 7,814,194 B2 | 10/2010 | Hellerstein et al. | |
| 7,890,929 B1 | 2/2011 | Johanson | |
| 7,996,415 B1 | 8/2011 | Raffill et al. | |
| 10,311,334 B1 * | 6/2019 | Florez Choque | G06K 9/6231 |
| 10,650,276 B1 * | 5/2020 | Florez Choque | G06N 3/084 |
| 2019/0206091 A1 * | 7/2019 | Weng | H04N 19/00 |
| 2019/0392260 A1 * | 12/2019 | Pang | G06K 9/627 |
| 2020/0090049 A1 * | 3/2020 | Aliper | G06F 18/2137 |
| 2020/0250812 A1 * | 8/2020 | Ceccaldi | G06V 10/764 |
| 2020/0257372 A1 * | 8/2020 | Abghari | G01C 19/00 |
| 2021/0150261 A1 * | 5/2021 | Zhang | G06K 9/6267 |
| 2021/0287141 A1 * | 9/2021 | Molloy | G06V 10/98 |

\* cited by examiner

SYSTEM FOR INTELLIGENT DRIFT MATCHING FOR UNSTRUCTURED DATA IN A MACHINE LEARNING ENVIRONMENT

FIELD OF THE INVENTION

The present invention embraces a system for intelligent drift matching for unstructured data in a machine learning environment.

BACKGROUND

The velocity and volume of data being generated, captured, or delivered forces machine learning models to continuously learn to remain accurate in their prediction. However, the computational and environmental costs of continuous training tend to increase with an increase in the model size and when additional tuning steps are used to increase the model's final accuracy. There is a need for a system for intelligent drift matching for unstructured data in a machine learning environment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for intelligent drift matching for unstructured data in a machine learning environment is presented. The system comprising: at least one non-transitory storage device; and at least one processing device coupled to the at least one non-transitory storage device, wherein the at least one processing device is configured to: electronically receive an original unseen image from a computing device associated with a user; initiate a convolutional encoder-decoder algorithm on the original unseen image; generate a reconstructed unseen image based on at least initiating the convolutional encoder-decoder algorithm on the original unseen image; generate an unseen input dataset based on at least the reconstructed unseen image; determine a reconstruction loss associated with the original unseen image based on at least the reconstructed unseen image; determine that the reconstruction loss associated with the original unseen image matches a first reconstruction loss associated with a first training image, wherein the first training image is associated with one or more training images; retrieve, from the data repository, a first set of parameters associated with the first training image based on at least determining the match; classify, using the first set of parameters, the original unseen image into one or more class labels.

In some embodiments, the at least one processing device is further configured to: electronically receive the one or more training images from the computing device associated with the user; initiate the convolutional encoder-decoder algorithm on the one or more training images; generate a reconstructed training image for each of the one or more training images based on at least initiating the convolutional encoder-decoder algorithm on the one or more training images; and determine a reconstruction loss for each of the one or more training images based on at least the reconstructed training image associated with each of the one or more training images.

In some embodiments, the at least one processing device is further configured to: generate a training dataset for each of the one or more training images based on at least the reconstructed training image associated with each of the one or more training images; initiate one or more machine learning algorithms on the training dataset associated with each of the one or more training images; and generate a set of parameters for each of the one or more training datasets.

In some embodiments, the at least one processing device is further configured to: electronically receive, via the computing device of the user, one or more class labels for the one or more training images; and generate the training dataset for each of the one or more training images based on at least the reconstructed training image associated with each of the one or more training images and the one or more class labels.

In some embodiments, the at least one processing device is further configured to: determine that the reconstruction loss associated with the original unseen image matches the first reconstruction loss associated with the first training image; electronically retrieve a first training dataset associated with the first training image; determine a similarity index associated with the first training dataset and the unseen input dataset; determine that the similarity index is lesser than a predetermined threshold; and retrieve, from the data repository, the first set of parameters associated with the first training image to classify the original unseen image into one or more class labels.

In some embodiments, the convolutional encoder-decoder algorithm comprises one or more encoder networks and one or more decoder networks.

In some embodiments, the at least one processing device is further configured to initiate the one or more encoder networks on the original unseen image, wherein initiating further comprises generating a low-resolution feature map based on the original unseen image using one or more convolutional layers and one or more pooling associated with the one or more encoder networks.

In some embodiments, the at least one processing device is further configured to initiate the one or more decoder networks, wherein initiating further comprises: upsampling the low-resolution feature map to produce a sparse feature map; and generating the reconstructed unseen image from the sparse feature map using one or more decoder filter banks.

In another aspect, a computer program product for intelligent drift matching for unstructured data in a machine learning environment is presented. The computer program product comprising a non-transitory computer-readable medium comprising code causing a first apparatus to: electronically receive an original unseen image from a computing device associated with a user; initiate a convolutional encoder-decoder algorithm on the original unseen image; generate a reconstructed unseen image based on at least initiating the convolutional encoder-decoder algorithm on the original unseen image; generate an unseen input dataset based on at least the reconstructed unseen image; determine a reconstruction loss associated with the original unseen image based on at least the reconstructed unseen image; determine that the reconstruction loss associated with the original unseen image matches a first reconstruction loss associated with a first training image, wherein the first training image is associated with one or more training images; retrieve, from a data repository, a first set of parameters associated with the first training image based on at least determining the match; classify, using the first set of parameters, the original unseen image into one or more class labels.

In yet another aspect, a method intelligent drift matching for unstructured data in a machine learning environment is presented. The method comprising: electronically receive an original unseen image from a computing device associated with a user; initiating a convolutional encoder-decoder algorithm on the original unseen image; generating a reconstructed unseen image based on at least initiating the convolutional encoder-decoder algorithm on the original unseen image; generating an unseen input dataset based on at least the reconstructed unseen image; determining a reconstruction loss associated with the original unseen image based on at least the reconstructed unseen image; determining that the reconstruction loss associated with the original unseen image matches a first reconstruction loss associated with a first training image, wherein the first training image is associated with one or more training images; retrieving, from a data repository, a first set of parameters associated with the first training image based on at least determining the match; classifying, using the first set of parameters, the original unseen image into one or more class labels.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
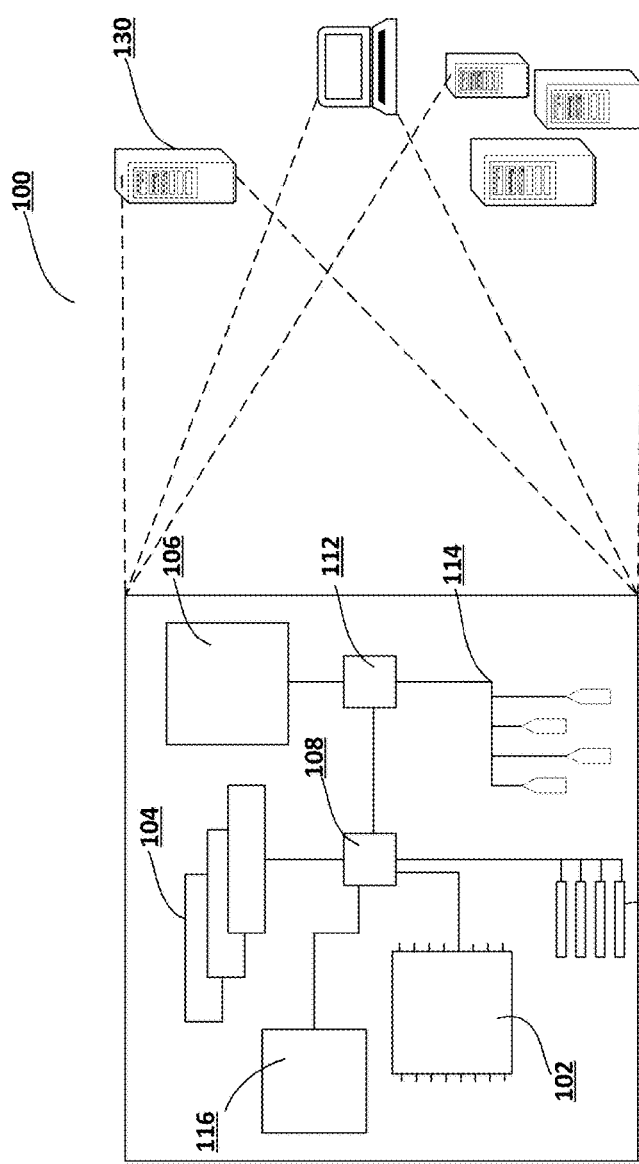
Figure 1:
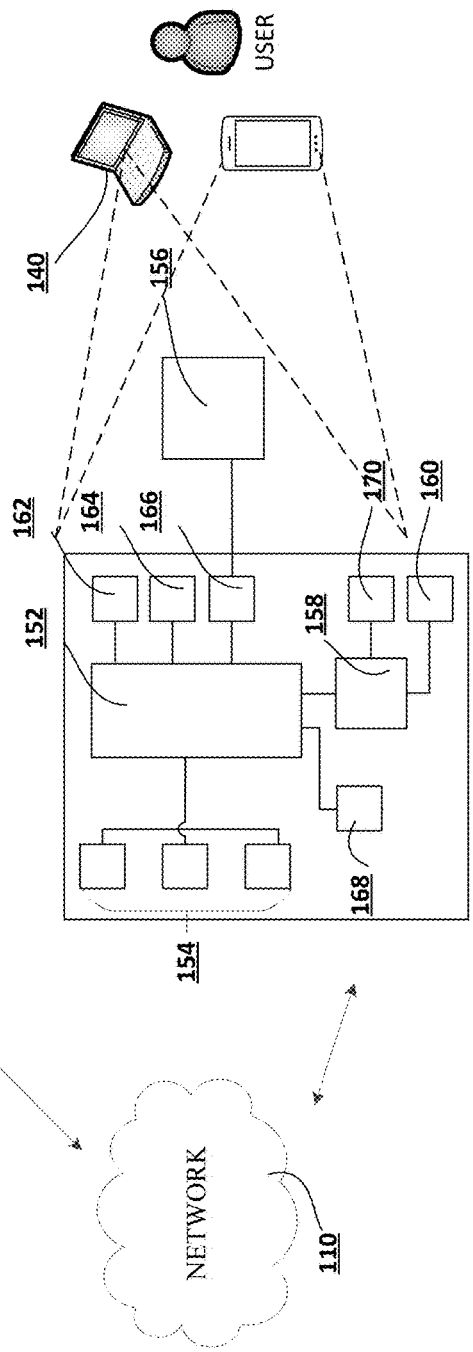
Figure 2:
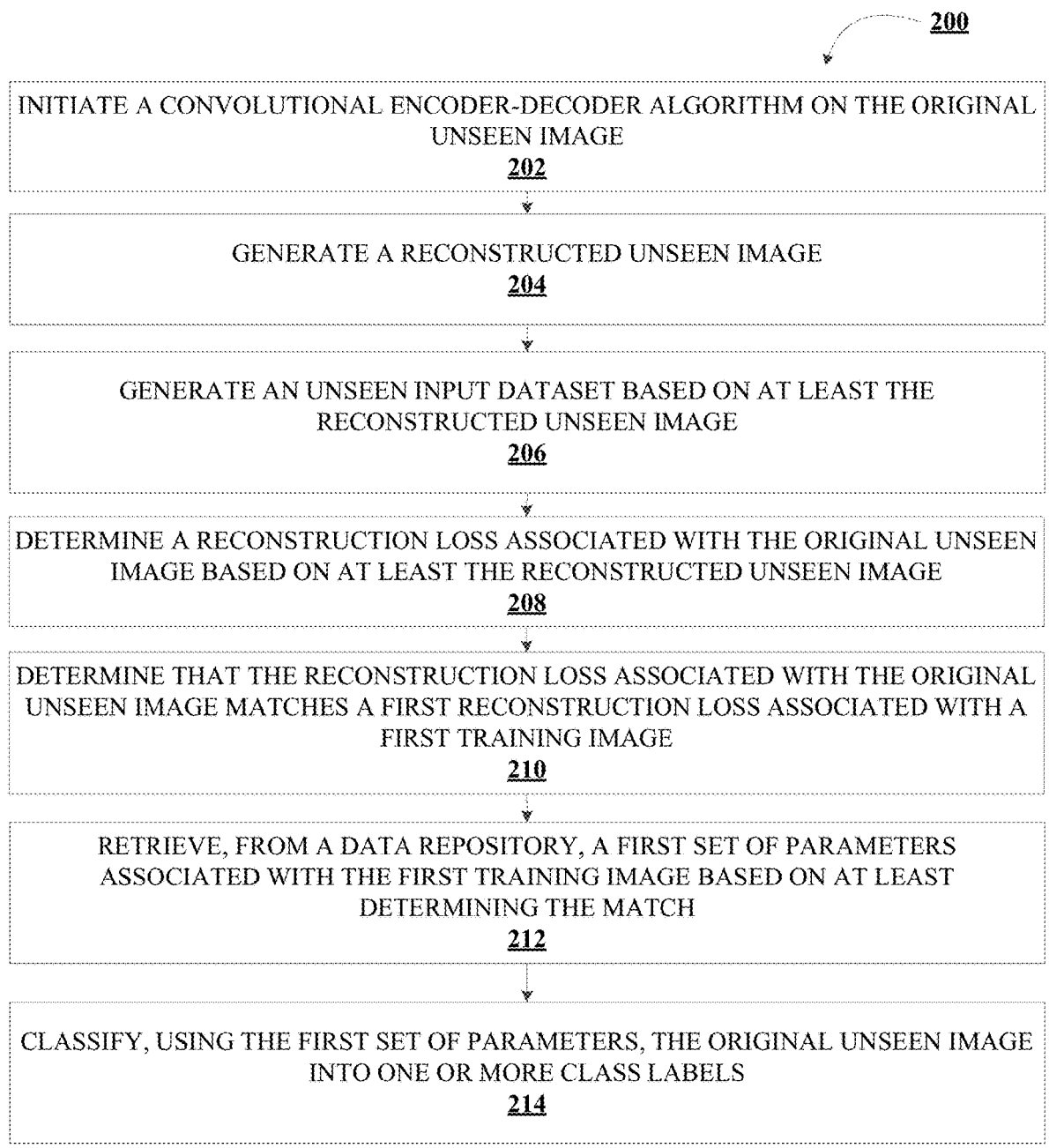
Figure 3A:
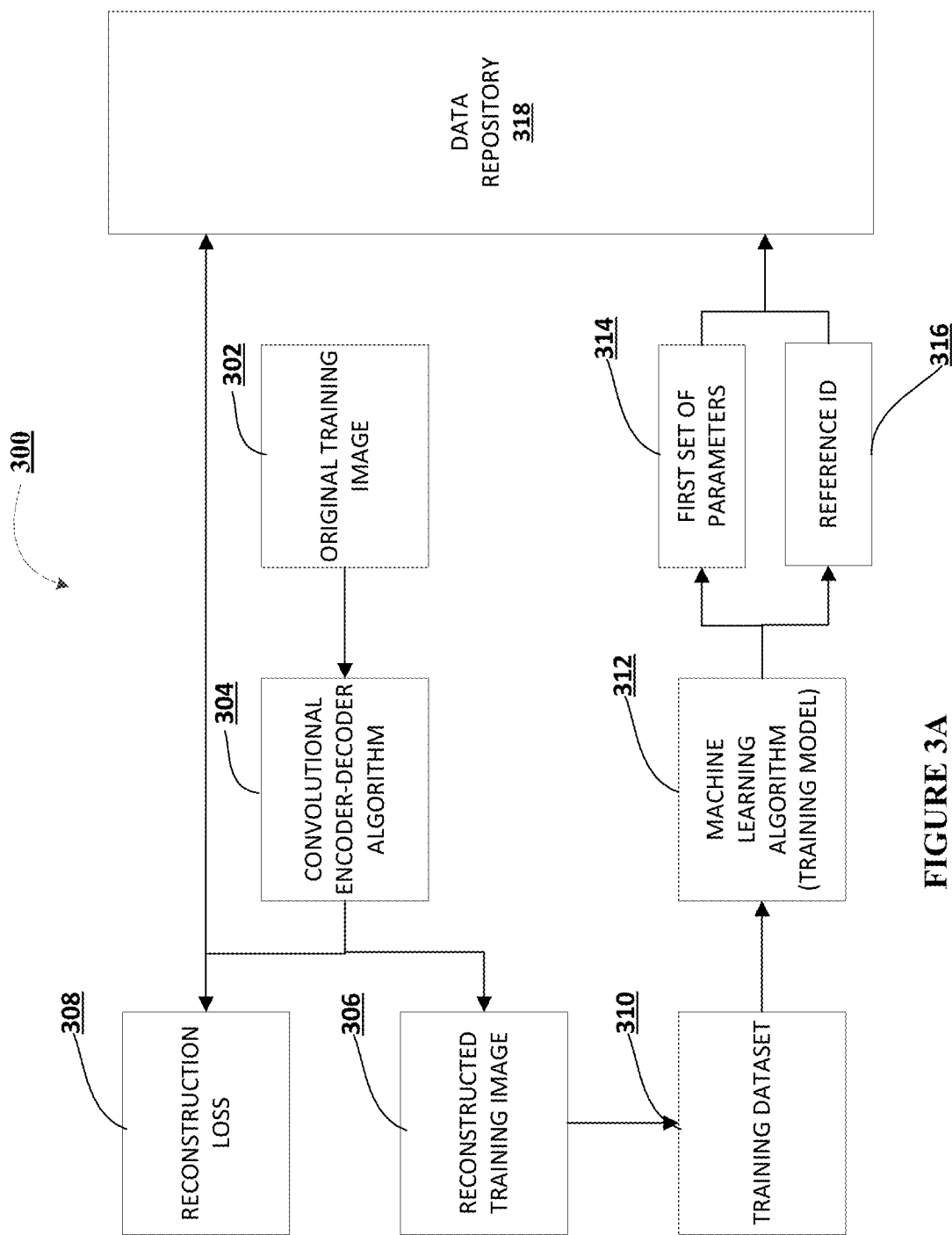
Figure 3B:
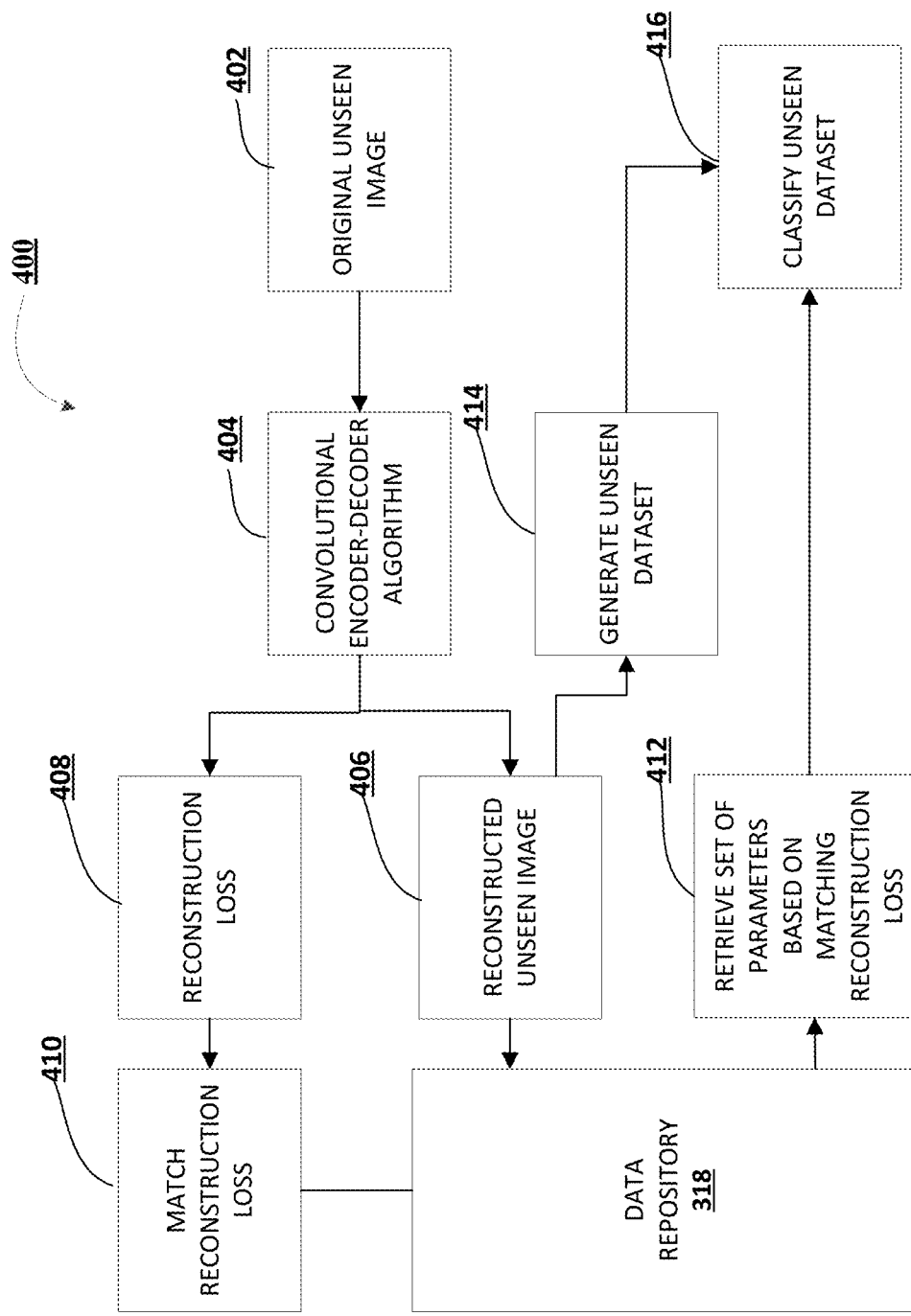

Having thus described embodiments of the invention in general terms, reference will now be made the accompanying drawings, wherein:

FIG. 1 illustrates technical components of a system for intelligent drift matching for unstructured data in a machine learning environment, in accordance with an embodiment of the invention;

FIG. 2 illustrates a process flow for intelligent drift matching for unstructured data in a machine learning environment, in accordance with an embodiment of the invention;

FIG. 3A illustrates a training phase for intelligent drift matching for unstructured data in a machine learning environment, in accordance with an embodiment of the invention; and FIG. 3B illustrates a reuse phase for intelligent drift matching for unstructured data in a machine learning environment, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for intelligent drift matching for unstructured data in a machine learning environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

The velocity and volume of data being generated, captured, or delivered forces machine learning models to continuously learn to remain accurate in their prediction. However, the computational and environmental costs of continuous training tend to increase with an increase in the model size and when additional tuning steps are used to increase the model's final accuracy. There is a need for a system to reuse the parameters generated by the machine learning model on input data that is same or similar to the one used to generate the parameters. The present invention provides the functional benefit of using drift matching technique in a machine learning environment to identify parameters to be reused to classify unseen data.

FIG. 2 illustrates a process flow for intelligent drift matching for unstructured data in a machine learning environment 200, in accordance with an embodiment of the invention. As shown in block 202, the process flow includes initiating a convolutional encoder-decoder algorithm on the original unseen image. As used herein, an "image" may refer to any digital artifact that is composed of picture elements, each with finite, discrete quantities of numeric representation for its intensity or gray level that is an output from its two dimensional functions fed as input by its spatial coordinates. In one aspect, an image may have several basic characteristics such as type, resolution, color depth, format, compression, and/or the like. In some embodiments, the system may be configured to electronically receive an original unseen image from a computing device associated with a user. In one aspect, the original unseen image is one that needs to be classified by the machine learning model into one or more class labels, as described in further detail below.

In some embodiments, the system may be configured to determine that the digital artifact is not an image. For example, the digital artifact may be a Portable Document Format (PDF), a multimedia file, a postscript file, a web text page, a spreadsheet file, a fillable template, and/or the like. In response, the system may be configured to initiate one or more file transformation algorithms on the digital artifact to convert the digital artifact from its initial non-image format to an image file. In one aspect, the system may be configured to initiate the file transformation algorithms on the digital artifacts in an ad-hoc manner. In this regard, the system may be configured to electronically receive the digital artifact from the computing device of the user. Once received, the system may be configured to determine that the digital artifact is not an image. In response, the system may be configured to initiate the file transformation algorithm on the digital artifact to transform the digital artifact into an image (original unseen image).

In some embodiments, the convolutional encoder-decoder is a class of deep learning algorithms capable of analyzing visual imagery in image classification. In one aspect, the convolutional encoder-decoder algorithm may include one or more encoder networks and one or more decoder networks. Each encoder network has a predetermined number of encoder layers and each decoder network has a predetermined number of decoder layers. In one aspect, the number of encoder layers in the encoder network and the number of decoder layers in the decoder network are equal, with each encoder layer having a corresponding decoder layer.

As shown in block 204, the process flow includes generating a reconstructed unseen image. In some embodiments, each encoder layer in the encoder network performs convolution with a filter bank to produce a set of feature maps. The encoder network typically alternates between convolution and pooling layers. The convolution layers pass a filter over the source image and extract the important information from each piece. The pooling layers take the extracted information and down sample it to retain only the most important information. In this way, the convolutional and pooling layers realize the filter-based convolution of features, abstract in their spatial dimensionality, and represent the extracted features from the original unseen image in the form of low-resolution feature maps according to their current depth in the network. The decoder layer then performs non-linear upsampling of the low-resolution feature maps to product a sparse feature map. These sparse feature maps are then convolved with a trainable decoder filter bank to produce the reconstructed unseen image.

As shown in block 206, the process flow includes determining an unseen input dataset based on at least the reconstructed unseen image. In some embodiments, the system may be configured to extract one or more features from the reconstructed unseen image to generate the unseen input dataset. In one aspect, the system may be configured to initiate a feature normalization algorithm on the one or more features extracted from the reconstructed unseen image. In response, the system may be configured to normalize, using the feature normalization algorithm, the one or more features to generate one or more normalized features. In some embodiments, normalizing the features may rescale the features extracted from the reconstructed unseen image to ensure that the features fit under the same probability distribution. In one aspect, this may involve centering the features around zero mean with a predefined standard deviation. In some other embodiments, the system may be configured to use the entirety of the reconstructed unseen image to generate the unseen input dataset.

As shown in block 208, the process flow includes determining a reconstruction loss associated with the original unseen image based on at least the reconstructed unseen image. In some embodiments, the reconstruction loss may refer to pixel loss between the original unseen image and the reconstructed unseen image based on at least implementing the convolutional encoder-decoder on the original unseen image. In one aspect, the reconstruction loss may be determined based on at least one or more algorithms capable of measuring the differences between values of the original unseen image and the reconstructed unseen image. Examples of such algorithms include, but are not limited to, Mean Square Error (MSE), Root Mean Squared Error (RMSE), Peak Signal to Noise Ratio (PSNR), Mean Absolute Error (MAE)/L1 loss, Structural Similarity Index (SSIM), Feature Loss (Perceptual Loss), Gram Matrix Loss, and/or the like.

As shown in block 210, the process flow includes determining that the reconstruction loss associated with the original unseen image matches a first reconstruction loss associated with a first training image. In some embodiments, the first training image may be associated with one or more training images. In one aspect, each of the one or more training images were previously processed by the convolutional encoder-decoder algorithm where a reconstruction loss was calculated for each of the one or more training images based on their respective reconstructed image. In addition to being processed by the convolutional encoder-decoder algorithm, the training images are processed using one or more machine learning algorithms where features extracted from training images are used to generate a set of parameters to fit a classification function.

In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating data relevant to the system 130.

Accordingly, the system may be configured to electronically receive the one or more training images from the computing device associated with the user. In response, the system may be configured to initiate the convolutional encoder-decoder algorithm on the one or more training images. In response, the system may be configured to generate a reconstructed training image for each of the one or more training images based on at least initiating the convolutional encoder-decoder algorithm on the one or more training images. In response, the system may be configured to determine a reconstruction loss for each of the one or more training images based on at least the reconstructed training image associated with each of the one or more training images. Based on the reconstructed training images, the system may be configured to generate a training dataset for each of the one or more training images. The training dataset is then processed by the one or more machine learning algorithms to determine a set of parameters. In this regard, the system may be configured to initiate one or more machine learning algorithms on the training dataset associated with each of the one or more training images. In response, the system may be configured to generate a set of parameters for each of the one or more training datasets.

In some embodiments, the system may be configured to electronically receive, via the computing device of the user, one or more class labels for the one or more training images. In some embodiments, the one or more class labels may be defined as discrete values based on predetermined image categories. In one aspect, the class labels may depend on the category of training images being used. For example, if the training images are form templates, then the class labels may be specific categories associated with form templates. In another example, if the training images are dog breeds, then the class labels may be specific categories associated with the different breeds of dogs. In response to receiving the one or more class labels from the user, the system may be configured to generate the training dataset for each of the one or more training images based on at least the reconstructed training image associated with each of the one or more training images and the one or more class labels.

In some embodiments, the system may be configured to determine that the reconstruction loss associated with the original unseen image matches the first reconstruction loss associated with the first training image. In response, the system may be configured to electronically retrieve a first training dataset associated with the first training image. In response, the system may be configured to determine a similarity index associated with the first training dataset and the unseen input dataset. In one aspect, the system may be configured to determine the similarity index using distance-based clustering algorithms. In this regard, the system may be configured to represent the first training dataset and the unseen input dataset into a cluster of data points in a multi-dimensional vector space. In some embodiments, the similarity index may be determined based on at least determining a distance measure between the data cluster associated with the first training dataset and the data cluster associated with the unseen input dataset. In response to determining the similarity index, the system may be configured to determine that the similarity index is lesser than a predetermined threshold. In one aspect, the predetermined threshold may be a threshold distance measure. A lower threshold distance indicates that the data clusters are closer to each other and are thus have a higher similarity index. On the other hand, a higher threshold distance indicates that the data clusters are farther away from each other and thus have a lower similarity index. By establishing a threshold on the distance measure, the system may be configured to determine how similar the first training dataset is to the unseen input dataset. If the similarity index is lesser than the predetermined threshold, the system may be configured to determine that the unseen input dataset matches the first training dataset. Therefore, in addition to determining a match between the reconstruction loss associated with the original unseen image and the reconstruction loss associated with each of the one or more training images, the system may also be configured to determine whether the unseen input dataset matches the training dataset associated with the training image whose reconstruction loss matches the reconstruction loss of the original unseen image.

As shown in block 212, the process flow includes retrieving, from a data repository, a first set of parameters associated with the first training image based on at least determining the match. In some embodiments, in response to determining that the similarity index is lesser than the predetermined threshold, the system may be configured to retrieve, from the data repository, the first set of parameters associated with the first training image. As shown in block 214, the process flow includes classifying, using the first set of parameters, the original unseen image into one or more class labels.

FIG. 3A illustrates a training phase for intelligent drift matching for unstructured data in a machine learning environment 300, in accordance with an embodiment of the invention. The original training image 302 is processed using a convolutional encoder-decoder 304 to generate the reconstructed training image 306. Based on the original training image 302 and the reconstructed training image 306, the reconstructed loss 308 is determined. This reconstructed loss 308 is stored in the data repository 318. Based on the reconstructed training image 306, the training dataset 310 is generated. This training dataset 310 is processed using a machine learning algorithm 312 to generate a first set of parameters 314. In addition to the first set of parameters 314, a reference identification no. 316 is also generated. Both the reconstruction loss 308 and the first set of parameters 314 are stored in the data repository 318 under the reference identification no. 316 that corresponds to the original training image 302.

FIG. 3B illustrates a reuse phase for intelligent drift matching for unstructured data in a machine learning environment 400, in accordance with an embodiment of the invention. The original unseen image 402 is processed using the convolutional encoder-decoder algorithm 404 (304) to generate the reconstructed unseen image 406. Based on the original unseen image 402 and the reconstructed unseen image 406, the reconstructed loss 408 is generated. This reconstructed loss 408 is matched 410 against one or more reconstructed losses stored in the data repository 318. Based on the match 410, the reference identification no. 316 is identified. Based on the reference identification no. 316, the associated set of parameters are retrieved 412. The unseen dataset is generated 414 using the reconstructed unseen image 406. Based on the set of parameters retrieved, the unseen dataset is classified into one or more class labels 416.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for intelligent drift matching for unstructured data in a machine learning environment, the system comprising:
    at least one non-transitory storage device; and
    at least one processing device coupled to the at least one non-transitory storage device, wherein the at least one processing device is configured to:
    electronically receive an original unseen image from a computing device associated with a user;
    initiate a convolutional encoder-decoder algorithm on the original unseen image;
    generate a reconstructed unseen image based on at least initiating the convolutional encoder-decoder algorithm on the original unseen image;
    generate an unseen input dataset based on at least the reconstructed unseen image;
    determine a reconstruction loss associated with the original unseen image based on at least the reconstructed unseen image;
    determine that the reconstruction loss associated with the original unseen image matches a first reconstruction loss associated with a first training image previously processed by the convolutional encoder-decoder algorithm, wherein the first training image is associated with one or more training images;
    retrieve, from a data repository, a first set of parameters associated with the first training image based on at least determining the match, wherein the first set of parameters are generated to fit a classification function by training the first training image using one or more machine learning algorithms;
    classify, using the first set of parameters, the original unseen image into one or more class labels.

2. The system of claim 1, wherein the at least one processing device is further configured to:
    electronically receive the one or more training images from the computing device associated with the user;
    initiate the convolutional encoder-decoder algorithm on the one or more training images;
    generate a reconstructed training image for each of the one or more training images based on at least initiating the convolutional encoder-decoder algorithm on the one or more training images; and
    determine a reconstruction loss for each of the one or more training images based on at least the reconstructed training image associated with each of the one or more training images.

3. The system of claim 2, wherein the at least one processing device is further configured to:
    generate a training dataset for each of the one or more training images based on at least the reconstructed training image associated with each of the one or more training images;
    initiate the one or more machine learning algorithms on the training dataset associated with each of the one or more training images; and
    generate a set of parameters for each of the one or more training datasets.

4. The system of claim 3, wherein the at least one processing device is further configured to:
    electronically receive, via the computing device of the user, one or more class labels for the one or more training images; and
    generate the training dataset for each of the one or more training images based on at least the reconstructed training image associated with each of the one or more training images and the one or more class labels.

5. The system of claim 4, wherein the at least one processing device is further configured to:
    determine that the reconstruction loss associated with the original unseen image matches the first reconstruction loss associated with the first training image;
    electronically retrieve a first training dataset associated with the first training image;
    determine a similarity index associated with the first training dataset and the unseen input dataset;
    determine that the similarity index is lesser than a predetermined threshold; and
    retrieve, from the data repository, the first set of parameters associated with the first training image to classify the original unseen image into one or more class labels.

6. The system of claim 1, wherein the convolutional encoder-decoder algorithm comprises one or more encoder networks and one or more decoder networks.

7. The system of claim 6, wherein the at least one processing device is further configured to initiate the one or more encoder networks on the original unseen image, wherein initiating further comprises generating a low-resolution feature map based on the original unseen image using one or more convolutional layers and one or more pooling associated with the one or more encoder networks.

8. The system of claim 7, wherein the at least one processing device is further configured to initiate the one or more decoder networks, wherein initiating further comprises:
    upsampling the low-resolution feature map to produce a sparse feature map; and
    generating, using one or more decoder filter banks, the reconstructed unseen image from the sparse feature map.

9. A computer program product for intelligent drift matching for unstructured data in a machine learning environment, the computer program product comprising a non-transitory computer-readable medium comprising code causing a first apparatus to:
    electronically receive an original unseen image from a computing device associated with a user;
        initiate a convolutional encoder-decoder algorithm on the original unseen image;
        generate a reconstructed unseen image based on at least initiating the convolutional encoder-decoder algorithm on the original unseen image;
        generate an unseen input dataset based on at least the reconstructed unseen image;
        determine a reconstruction loss associated with the original unseen image based on at least the reconstructed unseen image;
        determine that the reconstruction loss associated with the original unseen image matches a first reconstruction loss associated with a first training image previously processed by the convolutional encoder-decoder algorithm, wherein the first training image is associated with one or more training images;
        retrieve, from a data repository, a first set of parameters associated with the first training image based on at least determining the match, wherein the first set of parameters are generated to fit a classification function by training the first training image using one or more machine learning algorithms;
classify, using the first set of parameters, the original unseen image into one or more class labels.

10. The computer program product of claim 9, wherein the first apparatus is further configured to:
electronically receive the one or more training images from the computing device associated with the user;
initiate the convolutional encoder-decoder algorithm on the one or more training images;
generate a reconstructed training image for each of the one or more training images based on at least initiating the convolutional encoder-decoder algorithm on the one or more training images; and
determine a reconstruction loss for each of the one or more training images based on at least the reconstructed training image associated with each of the one or more training images.

11. The computer program product of claim 10, wherein the first apparatus is further configured to:
generate a training dataset for each of the one or more training images based on at least the reconstructed training image associated with each of the one or more training images;
initiate the one or more machine learning algorithms on the training dataset associated with each of the one or more training images; and
generate a set of parameters for each of the one or more training datasets.

12. The computer program product of claim 11, wherein the first apparatus is further configured to:
electronically receive, via the computing device of the user, one or more class labels for the one or more training images; and
generate the training dataset for each of the one or more training images based on at least the reconstructed training image associated with each of the one or more training images and the one or more class labels.

13. The computer program product of claim 12, wherein the first apparatus is further configured to:
determine that the reconstruction loss associated with the original unseen image matches the first reconstruction loss associated with the first training image;
electronically retrieve a first training dataset associated with the first training image,
determine a similarity index associated with the first training dataset and the unseen input dataset;
determine that the similarity index is lesser than a predetermined threshold; and
retrieve, from the data repository, the first set of parameters associated with the first training image to classify the original unseen image into one or more class labels.

14. The computer program product of claim 9, wherein the convolutional encoder-decoder algorithm comprises one or more encoder networks and one or more decoder networks.

15. The computer program product of claim 14, wherein the first apparatus is further configured to initiate the one or more encoder networks on the original unseen image, wherein initiating further comprises generating a low-resolution feature map based on the original unseen image using one or more convolutional layers and one or more pooling associated with the one or more encoder networks.

16. The computer program product of claim 15, wherein the first apparatus is further configured to initiate the one or more decoder networks, wherein initiating further comprises:
upsampling the low-resolution feature map to produce a sparse feature map; and
generating, using one or more decoder filter banks, the reconstructed unseen image from the sparse feature map.

17. A method intelligent drift matching for unstructured data in a machine learning environment, the method comprising:
electronically receive an original unseen image from a computing device associated with a user;
initiating a convolutional encoder-decoder algorithm on the original unseen image;
generating a reconstructed unseen image based on at least initiating the convolutional encoder-decoder algorithm on the original unseen image;
generating an unseen input dataset based on at least the reconstructed unseen image;
determining a reconstruction loss associated with the original unseen image based on at least the reconstructed unseen image;
determining that the reconstruction loss associated with the original unseen image matches a first reconstruction loss associated with a first training image previously processed by the convolutional encoder-decoder algorithm, wherein the first training image is associated with one or more training images;
retrieving, from a data repository, a first set of parameters associated with the first training image based on at least determining the match, wherein the first set of parameters are generated to fit a classification function by training the first training image using one or more machine learning algorithms;
classifying, using the first set of parameters, the original unseen image into one or more class labels.

18. The method of claim 17, wherein the method further comprises:
electronically receiving the one or more training images from the computing device associated with the user;
initiating the convolutional encoder-decoder algorithm on the one or more training images;
generating a reconstructed training image for each of the one or more training images based on at least initiating the convolutional encoder-decoder algorithm on the one or more training images; and
determining a reconstruction loss for each of the one or more training images based on at least the reconstructed training image associated with each of the one or more training images.

19. The method of claim 18, wherein the method further comprises:
generating a training dataset for each of the one or more training images based on at least the reconstructed training image associated with each of the one or more training images;
initiating the one or more machine learning algorithms on the training dataset associated with each of the one or more training images; and
generating a set of parameters for each of the one or more training datasets.

20. The method of claim 19, wherein the method further comprises:
electronically receiving, via the computing device of the user, one or more class labels for the one or more training images; and
generating the training dataset for each of the one or more training images based on at least the reconstructed training image associated with each of the one or more training images and the one or more class labels.

* * * * *